W. ROBINSON.
Automatic Electric Communicators.

No. 154,520.  Patented Aug. 25, 1874.

Witnesses,
Wm. A. Bertram
H. C. Gilmour

Inventor,
Wm. Robinson

UNITED STATES PATENT OFFICE.

WILLIAM ROBINSON, OF BROOKLYN, NEW YORK.

IMPROVEMENT IN AUTOMATIC ELECTRIC COMMUTATORS.

Specification forming part of Letters Patent No. 154,520, dated August 25, 1874; application filed July 18, 1873.

CASE H.

*To all whom it may concern:*

Be it known that I, WILLIAM ROBINSON, of Brooklyn, in the county of Kings and State of New York, have invented certain Improvements in Automatic Commutators for Electric Signaling and other purposes, of which the following is a specification:

This invention relates particularly to that class of electric signals for railroads in which the normal condition of the circuit is closed, and is designed to automatically throw two batteries alternately into and out of circuit at frequent intervals, thus giving them time to rest and recuperate.

The invention consists, first, in the combination with two batteries of an electro-magnetic commutator placed in circuits partially common to both batteries, and operating to switch out one and switch in the other battery through the action of one of said batteries; secondly, in an electro-magnetic commutator and two batteries in combination with two or more rail-sections, the one section operating to close the circuit through the commutator, and thereby determining the battery to be connected to the other rail-section.

Figure 1:
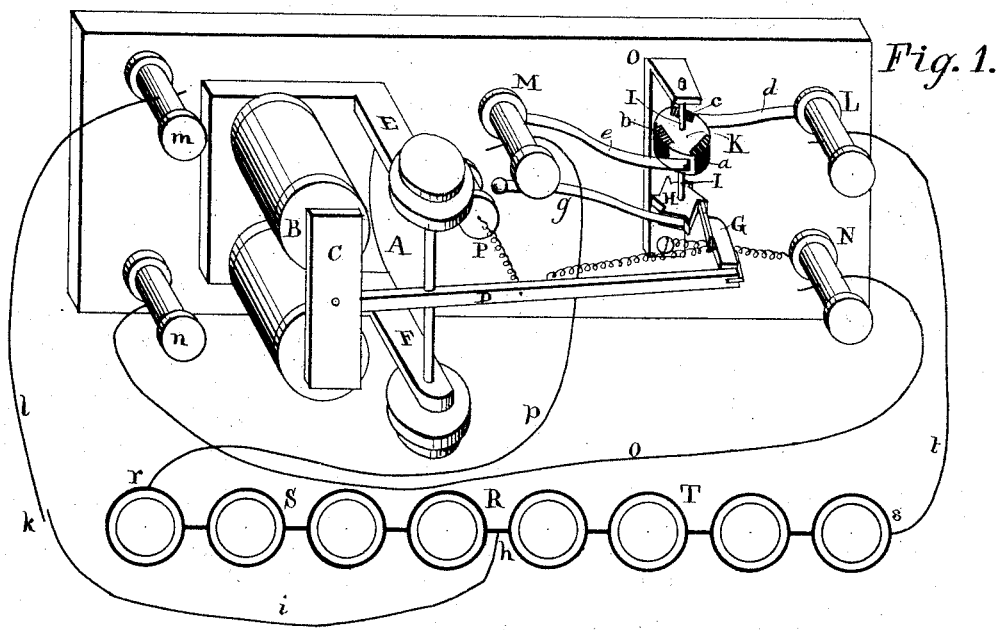
Figure 2:
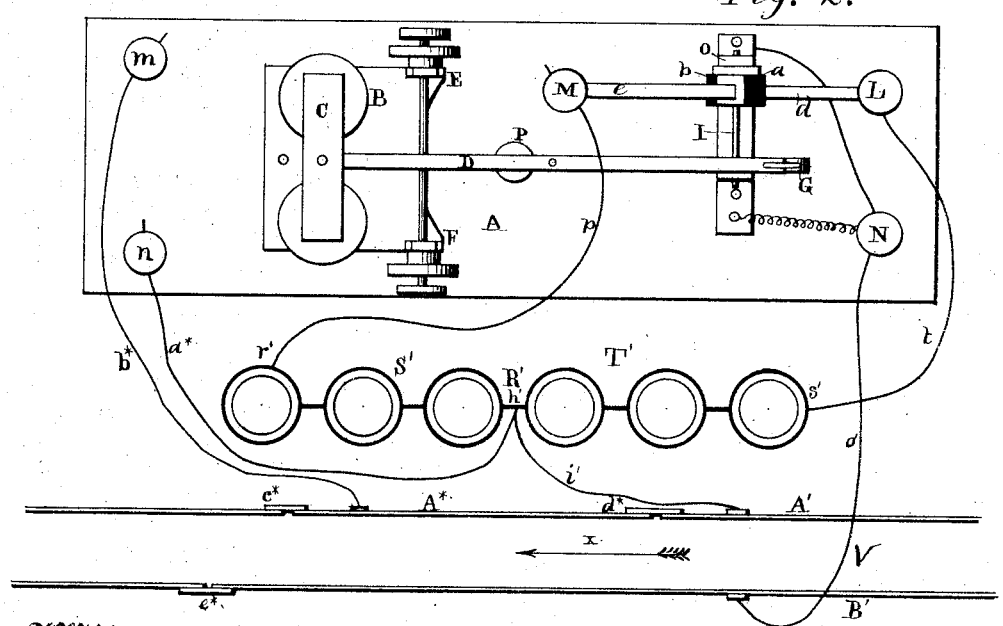

In the accompanying drawing, which forms a part of this specification, Figure 1 is a perspective view of the invention, showing it as applied to a railroad-signal, and connected so as to change the battery of the same. Fig. 2 is a top view of the invention, showing it as applied for the purpose of changing rail-batteries.

In Fig. 1 the magnet B, armature C, and lever D may be considered as a part of the operating mechanism of a visual signal—for instance, of that fully described in application, Case G, filed on the same date herewith.

The commutating-wheel K, which is fixed to the arbor I, is grooved at intervals, so that, as it turns on its axis, the spring-plates $d$ $e$ are alternately brought in contact with said commutator K, the one plate being in contact with the same, while the other is insulated therefrom. To the arbor I is also fixed the ratchet-wheel H, with which gears the ratchet G, the latter being connected to the lever D.

The circuits are traced as follows: Let R represent a battery subdivided into two parts, S and T. From an intermediate point, $h$, of the battery R runs the wire $i$ to a relay, key, or other circuit-closer at $k$; thence runs the wire $l$ to the post $m$; thence through the coils of the magnet B to the post $n$; thence by the wire $o$ to the post N; thence to the bearing O, arbor I, and commutator K; thence by the spring $e$ to the post M, and thence by the wire $p$ to the pole $r$ of the battery S; thence by said battery to $h$, the place of beginning. From the pole $s$ of the battery T runs the wire $t$ to the post L, which is in contact with the spring-plate $d$.

The mode of operation is as follows: When connection is established at $k$ between the wires $i$ $l$, the circuit is complete from the pole $h$ of the battery S, through the wires $i$ $l$, magnet B, wire $o$, post N, bearing O, commutator K, spring-plate $e$, and wire $p$, to the opposite pole $r$ of the battery S, thus magnetizing the magnet B, which, attracting its armature, not only swings the signal-banner, but also draws the ratchet G back one space. Now, when the circuit is again opened, as by separating the wires at $k$, and the magnet B thus demagnetized, the spring P, by reversing the lever D, and consequently the ratchet G, causes the ratchet-wheel H and commutator K to turn one space, thus bringing the plate $d$ in contact with the commutator K, and at the same time insulating the plate $e$ from said commutator, whereby the circuit is changed from the wire $p$ and battery S to the wire $t$ and battery T. It is evident that closing the circuit now at $k$ will bring the battery T into circuit instead of the battery S, as before. Thus, as the signal is changed, the batteries S and T are alternately thrown into and out of circuit.

Fig. 2 shows how the commutator operates in changing batteries connected to the rails of a railroad. In this figure, V represents the end of a section of railroad-track, which may extend a mile, more or less, to the right. At the farther end of the section, a relay or magnet is connected by wires to the rails A' B', substantially in the manner described in my patent of August 20, 1872. Said relay is magnetized by currents from the batteries S' T' passing through the rails A' B', and demagnetized by a train coming between the magnet and battery, and thus short-circuiting the current.

The circuits are traced as follows: From the pole $r'$ of the battery S' by the wire $p$ to the post M; thence by the spring-plate $e$ to the commutator K; thence to the post N, and by the wire $o'$ to the rail B'; thence through the rail B' to and through the coils of the distant relay or magnet before mentioned; thence completing the circuit of the battery S' through the rail A' and wire $i'$. The wire $t$ runs from the post L to the pole $s'$ of the battery T' in the same manner as in Fig. 1. From the wire $i'$, or the intermediate point $h'$, extends the wire $a^*$ to the post $n$ of the magnet B, from the other post, $m$, of which extends the wire $b^*$ to the short section of rail A*. Separation of the rail-sections from metallic contact with adjacent sections is secured in any suitable manner—for instance, by the joint-blocks $c^*$ $d^*$ $e^*$.

The mode of operation is as follows: It being understood that either the one or the other of the batteries S' T' is always in electrical connection with the rail B' through the commutator and the wire $o'$, when a train (approaching, say, in the direction of the arrow $x$) reaches the short section of rail A*, it completes the circuit through one or other of the batteries S' T', the commutator K, wire $o'$, rail B', wheels and axles of the car or train, rail-section A*, wire $b^*$, magnet B, and wire $a^*$. The magnet B, being thus magnetized, attracts its armature, and draws the ratchet G back one space. The rail section A* is made of such length that the magnet remains magnetized until the whole train has passed off the section A*, when it is again demagnetized by the breaking of the circuit, caused by the absence of the wheels and axles. When the circuit is thus broken, the spring P reverses the lever D and changes the commutator, and, consequently, the battery, in the manner hereinbefore fully described in connection with Fig. 1.

I often prefer, for the sake of greater power, to pass a current from the whole of the battery R' temporarily through the magnet B. To do this the wire $a^*$ is disconnected from $h'$ and connected to a supplemental plate placed in such proximity and relationship to the spring-plates $d$ $e$ that each of said spring-plates connects alternately with said supplemental plate and the commutator K, one of the plates $d$ $e$ being always in contact with the supplemental plate, while the other is in contact with K. In this case the circuit is, rail-section A*, wire $b^*$, magnet B, wire $a^*$, supplemental plate mentioned, spring-plate $d$, wire $t$, battery R', wire $p$, plate $e$, commutator K, wire $o'$, rail B', and wheels and axles of the car.

When the circuit through the magnet B, Fig. 1, is open at $k$, and the signal consequently exposed, I sometimes throw the whole of the battery R on a line-wire to operate one or more distant secondary signals in conjunction with the primary signal. To accomplish this the construction is modified by the addition of a supplemental plate, as described in connection with Fig. 2, and the connections are also somewhat modified accordingly.

I have described the commutator shown in Fig. 1 as attached to a visual signal, for the purpose of changing the batteries of the same. I do not, however, confine the invention to the changing of signal-batteries. It may be employed wherever found useful or desirable to change batteries of any description used for any purpose. It will be observed, also, that while the actual change of battery may be caused to take place when the magnet attracts its armature, yet I prefer to arrange it so that no change of connections shall take place when the armature is attracted, the actual change taking place only during the reverse movement of the armature, caused by the retractile force of the spring. Furthermore, when desired, the batteries may be so connected in circuit that reverse currents shall be passed through the magnets every time the batteries are changed. This arrangement is often found advantageous in prolonging the actual working duration of the batteries.

What I claim as new, and desire to secure by Letters Patent, is—

1. In combination with two galvanic batteries, an electro-magnetic commutator, constructed substantially as described, placed in circuits partially common to both batteries, and operating to switch out one and switch in the other battery through the action of one of the batteries, substantially as and for the purposes set forth.

2. In combination with the electro-magnetic commutator having the described circuit-connections, the rail-sections A' A*, the one closing the circuit through the commutator, and thereby determining the battery to be connected to the other rail-section, substantially as and for the purposes set forth.

WILLIAM ROBINSON.

Witnesses:
JAMES J. WILSON,
WM. H. BAYZAUD.